(12) United States Patent
Liu et al.

(10) Patent No.: US 11,352,110 B1
(45) Date of Patent: Jun. 7, 2022

(54) FLEXIBLE UNDERWATER ROBOT, CONTROL METHOD AND DEVICE

(71) Applicants: Guangzhou University, Guangzhou (CN); Guangdong Rongjun Construction Engineering Testing Corp., Ltd., Guangzhou (CN)

(72) Inventors: Airong Liu, Guangzhou (CN); Jiaqiao Liang, Guangzhou (CN); Junda Chen, Guangzhou (CN); Jiyang Fu, Guangzhou (CN); Bingcong Chen, Guangzhou (CN); Wengao Xie, Guangzhou (CN); Yixiao Zhang, Guangzhou (CN); Weicai Li, Guangzhou (CN); Pengcheng Su, Guangzhou (CN)

(73) Assignees: GUANGZHOU UNIVERSITY, Guangzhou (CN); GUANGDONG RONGJUN CONSTRUCTION ENGINEERING TESTING CORP., LTD., Guangzhou (CN)

( * ) Notice: Subject to any disclaimer, the term of this patent is extended or adjusted under 35 U.S.C. 154(b) by 0 days.

(21) Appl. No.: 17/510,767

(22) Filed: Oct. 26, 2021

(30) Foreign Application Priority Data

Sep. 24, 2021 (CN) .......................... 202111118828.3

(51) Int. Cl.
| | |
|---|---|
| *B63G 8/00* | (2006.01) |
| *B63G 8/08* | (2006.01) |
| *B25J 9/00* | (2006.01) |
| *B63G 8/16* | (2006.01) |
| *B25J 9/06* | (2006.01) |
| *B63G 8/20* | (2006.01) |

(52) U.S. Cl.
CPC ............ *B63G 8/001* (2013.01); *B25J 9/0015* (2013.01); *B25J 9/065* (2013.01); *B63G 8/16* (2013.01); *B63G 8/20* (2013.01); *B63G 2008/002* (2013.01)

(58) Field of Classification Search
CPC . B63G 8/001; B63G 8/16; B63G 8/00; B63G 8/08; B25J 9/0015; B25J 9/065; B25J 9/0009; B25J 9/06
USPC ....................................................... 114/337
See application file for complete search history.

(56) References Cited

U.S. PATENT DOCUMENTS

| | | | | |
|---|---|---|---|---|
| 4,848,179 | A * | 7/1989 | Ubhayakar | ................ B25J 9/06 74/490.04 |
| 2009/0248202 | A1* | 10/2009 | Osuka | .................. B62D 57/024 700/245 |
| 2015/0321343 | A1* | 11/2015 | Armand | ................ B25J 9/1075 74/490.04 |

(Continued)

*Primary Examiner* — Paul T Chin

(74) *Attorney, Agent, or Firm* — Getech Law LLC; Jun Ye

(57) ABSTRACT

A flexible underwater robot, a control method and a device is provided with at least one movable joint and a control module. A flexible joint module of the movable joint comprises a first connecting plate, a second connecting plate, a first spring, several second springs, several third springs, several first pulling ropes, several second pulling ropes and a pulling module. The first spring, the second springs and the third springs are arranged from inside to outside in sequence with gradually decreased rigidities correspondingly to form a gradual rigidity structure, so that it is more flexible to adjust a posture. When the robot is impacted, it may absorb and release energy to ensure the integrity of the flexible joint module, so that the stability is improved.

7 Claims, 7 Drawing Sheets

(56) References Cited

U.S. PATENT DOCUMENTS

| | | | |
|---|---|---|---|
| 2015/0352728 A1* | 12/2015 | Wang | A61B 1/00 |
| | | | 74/490.04 |
| 2018/0021945 A1* | 1/2018 | Pettersen | E21B 41/04 |
| | | | 700/245 |
| 2019/0054637 A1* | 2/2019 | Asada | B25J 9/065 |
| 2020/0307750 A1* | 10/2020 | Jing | B63G 8/08 |
| 2021/0078165 A1* | 3/2021 | Tang | B62D 57/024 |
| 2022/0001552 A1* | 1/2022 | Kim | B25J 9/00 |

\* cited by examiner

FLEXIBLE UNDERWATER ROBOT, CONTROL METHOD AND DEVICE

TECHNICAL FIELD

The present invention relates to the field of robots, in particular to a flexible underwater robot, a control method and a device.

BACKGROUND

Nowadays, the demand on marine sources is increased gradually, offshore engineering emerges on a large-scale, and it is higher and higher in demand on fault localization and pipeline detection of underwater buildings. In a conventional mode, a diver carries an oxygen bottle to go to a sea to operate. In the process accompanied with a risk of overpressure and assault by large aquatic organisms, part of narrow terrain spaces may not be penetrated, so that an underwater flexible robot emerges for fulfilling tasks such as detection of a complex pipeline. As the task asks the flexible underwater robot to have a flexible steering mechanism to fit the task, it is hard to adjust steering of all directions by steering engine control when the robot moves in a pipeline environment, for example, encounters a corner, because a rotating joint of the flexible underwater robot in a current stage outputs a twisting moment by using a conventional gear mechanical structure or a soft pneumatic structure, so that the robot is poor in flexibility and inflexible to adjust gesture. The flexible underwater robot subject to impact is easily destroyed, so that the robot is poor in stability, and therefore, it is necessary to seek for a solution.

SUMMARY

For this purpose, in order to solve at least one of the abovementioned technical problems, the objective of the present invention is to provide a flexible underwater robot, a control method and a device, so that the flexibility and the stability are improved.

The technical scheme adopted by the embodiments of the present invention is as follows:

A flexible underwater robot, the robot including:

at least one movable joint, the movable joint including a pushing module, a rotating cloud platform and a flexible joint module, wherein the pushing module is configured to push the flexible joint module;

the rotating cloud platform is provided with an ultrasonic probe to acquire ultrasonic signals;

the flexible joint module is fixedly connected with the rotating cloud platform and comprises a first connecting plate, a second connecting plate, a first spring, several second springs, several third springs, several first pulling ropes, several second pulling ropes and a pulling module, one end of the first spring, one ends of the second springs, one ends of the third springs and one ends of the first pulling ropes are fixed to the first connecting plate, the other end of the first spring, the other ends of the second springs and the other ends of the third springs are fixed to the second connecting plate, the other ends of the first pulling ropes and one ends of the second pulling ropes are fixed to the pulling module, and the other ends of the second pulling ropes are fixed to the second connecting plate; the first spring, the second springs and the third springs are arranged from inside to outside in sequence with gradually decreased rigidities correspondingly to form a gradual rigidity structure; the pulling module is located between the first connecting plate and the second connecting plate and is used to control the first pulling ropes and the second pulling ropes to adjust movement of the first connecting plate and the second connecting plate;

the control module is configured to control the pulling module and the pushing module according to the ultrasonic signals.

Further, one ends of the different first pulling ropes are fixed at different positions of the first connecting plate and the other ends of different second pulling ropes are fixed at different positions of the second connecting plate; the pulling module comprises a main body, a first steering engine module, several first arbor wheel units and several second arbor wheel units; a front side, a back side, a left side and a right side of the main body are fixed with the first second arbor wheel units and the second arbor wheel units; each of the first arbor wheel units is fixed to the other end of each of the first pulling ropes, each of the second arbor wheel units is fixed to one end of the second pulling ropes, and the first steering engine module is connected with the control module and is configured to control the first arbor wheel units and the second arbor wheel units to rotate.

Further, the rotating cloud platform includes a waterproof gasket, a cloud platform protecting sleeve, a pedestal, a second steering engine module, a waterproof bearing and a camera, and the second steering engine module and the camera are connected with the control module; the waterproof gasket is arranged in a part where the pedestal and the flexible joint module are connected fixedly, the second steering engine module and the camera are arranged in the pedestal, and the pedestal and the cloud platform protecting sleeve are connected via the waterproof bearing.

Further, the pushing module includes an omnidirectional propelling module and a main propeller; the main propeller is configured to provide a propelling force to the flexible joint module, the omnidirectional propelling module comprises an outer shell, a yaw driver and a pitch driver, and the main propeller, the yaw driver and the pitch driver are connected with the control module; the yaw driver and the pitch driver are housed in the outer shell, the outer shell and the flexible joint module are fixed, the yaw driver is configured to control a yaw angle and a pitch angle of the omnidirectional propelling module, and the pitch driver is configured to control a sinking and floating gesture and a pitch gesture of the omnidirectional propelling module.

Further, the yaw driver includes a brushless motor and symmetrically arranged screw propellers, the screw propellers stretch out of the outer shell in a protruding manner and the brushless motor is connected with the screw propellers.

Further, the flexible underwater robot further includes a head module and a tail module, wherein the head module is fixed to one of the omnidirectional propelling module and the rotating cloud platform and a fixed position therebetween is provided with a seal ring and a fastener, the tail module is fixed to the other one of the omnidirectional propelling module and the rotating cloud platform, the head module is provided with an LED lamp, the main propeller is arranged on the tail module, and the LED lamp is connected with the control module.

Further, the flexible underwater robot further includes a cavity module, wherein the head module is fixed to one of the omnidirectional propelling module and the rotating cloud platform via the cavity module, the cavity module is provided with a temperature sensor, a pressure sensor, a Doppler velocimeter and a six-axis accelerometer, and the temperature sensor, the pressure sensor, the Doppler velocimeter and the six-axis accelerometer are connected with the control module to acquire hydrological data.

The embodiments of the present invention further provide a control method applied to the flexible underwater robot, the method including:

acquiring ultrasonic signals via an ultrasonic probe;

calculating, by the control module, an expected obstacle avoidance gesture of the flexible underwater robot to determine an azimuth angle according to the ultrasonic signals, and controlling, by the control module, a pulling module and a pushing module to avoid obstacles according to the azimuth angle.

Further, the method further includes:

controlling, by the control module, the pulling module and the flexible joint module according to a control signal sent by a ground station when the flexible underwater robot is in a remote control model, wherein the control signal is obtained by carrying out PI operation according to a difference between the expected gesture and a current gesture of the flexible underwater robot, and the current gesture is solved according to current gesture information acquired by a preset connecting rod model and a six-axis accelerometer; or, controlling, by the control module, the pulling module and a flexible joint module according to a preset task when the flexible underwater robot is in an autonomous mode; and acquiring hydrological data in the process of the preset task, storing the hydrological data or transmitting the hydrological data to a ground station via an ultrasonic communication module.

The embodiments of the present invention further provide an electronic device, the electronic device including a processor and a memory, the memory having at least one instruction, at least one program, a code set or an instruction set stored therein, the at least one instruction, the at least one program, the code set or the instruction set being loaded and executed by the processor to realize the control method.

The embodiments of the present invention further provide a computer readable storage medium, the storage medium having at least one instruction, at least one program, a code set or an instruction set stored therein, the at least one instruction, the at least one program, the code set or the instruction set being loaded and executed by the processor to realize the method.

The present invention has the beneficial effects that the robot is provided with at least one movable joint and a control module; the movable joint includes a pushing module, a rotating cloud platform and a flexible joint module; the flexible joint module is fixedly connected with the rotating cloud platform and includes a first connecting plate, a second connecting plate, a first spring, several second springs, several third springs, several first pulling ropes, several second pulling ropes and a pulling module, one end of the first spring, one ends of the second springs, one ends of the third springs and one ends of the first pulling ropes are fixed to the first connecting plate, the other end of the first spring, the other ends of the second springs and the other ends of the third springs are fixed to the second connecting plate, the other ends of the first pulling ropes and one ends of the second pulling ropes are fixed to the pulling module, and the other ends of the second pulling ropes are fixed to the second connecting plate; the pulling module is located between the first connecting plate and the second connecting plate and is configured to control the first pulling rope and the second pulling rope to adjust movement of the first connecting plate and the second connecting plate, the first spring, the second springs and the third springs are arranged from inside to outside in sequence with gradually decreased rigidities correspondingly to form a gradual rigidity structure, so that it is more flexible to adjust gesture; when the robot is impacted, it may absorb and release energy to ensure the integrity of the flexible joint module, so that the stability is improved; the control module is configured to control the pulling module and a pushing module according to ultrasonic signals, and may control the pulling module and the pushing module according to the ultrasonic signals, so that the flexible underwater robot works normally.

BRIEF DESCRIPTION OF THE DRAWINGS

FIG. 8 is a step flow diagram of a control method of a specific embodiment of the present invention.

FIG. 9 is an electronic block diagram of a microcomputer and a central controller of a specific embodiment of the present invention.

DETAILED DESCRIPTION

In order to make those skilled in the art better understand the schemes of the application, clear and intact description will be made on the technical schemes in the embodiments below in combination with drawings in the embodiments of the application. Apparently, the described embodiments are merely a part of embodiments of the application and are not all the embodiments. On a basis of the embodiments in the disclosure, all other embodiments obtained by those skilled in the technical field without creative efforts fall into the scope of protection of the disclosure.

Terms "first", "second", "third", "fourth" and the like in the description, claims or drawings of the application are used for distinguishing similar objects rather than describing a specific sequence. In addition, terms "include" and "have" and any deformation thereof are intended to cover non-exclusive inclusion. For example, a process, method, product or device including a series of steps or units are not defined listed steps or units but further optionally include steps or units not listed or further optionally include inherent other steps or units for the process, method, product or device.

The "embodiments" in the application mean that specific features, structure or characteristics described in combination with the embodiments may be included in at least one embodiment of the application. The phrase emerges in each position of the description is not necessary the same embodiment or independent or alternative embodiments mutually exclusive to other embodiments. Those skilled in the art explicitly and implicitly understand that the embodiments described in the description may be combined with other embodiments.

In the embodiments of the present invention, X direction is a left-right direction, Y direction is a front-back direction and Z is an up-down direction.

Figure 1:
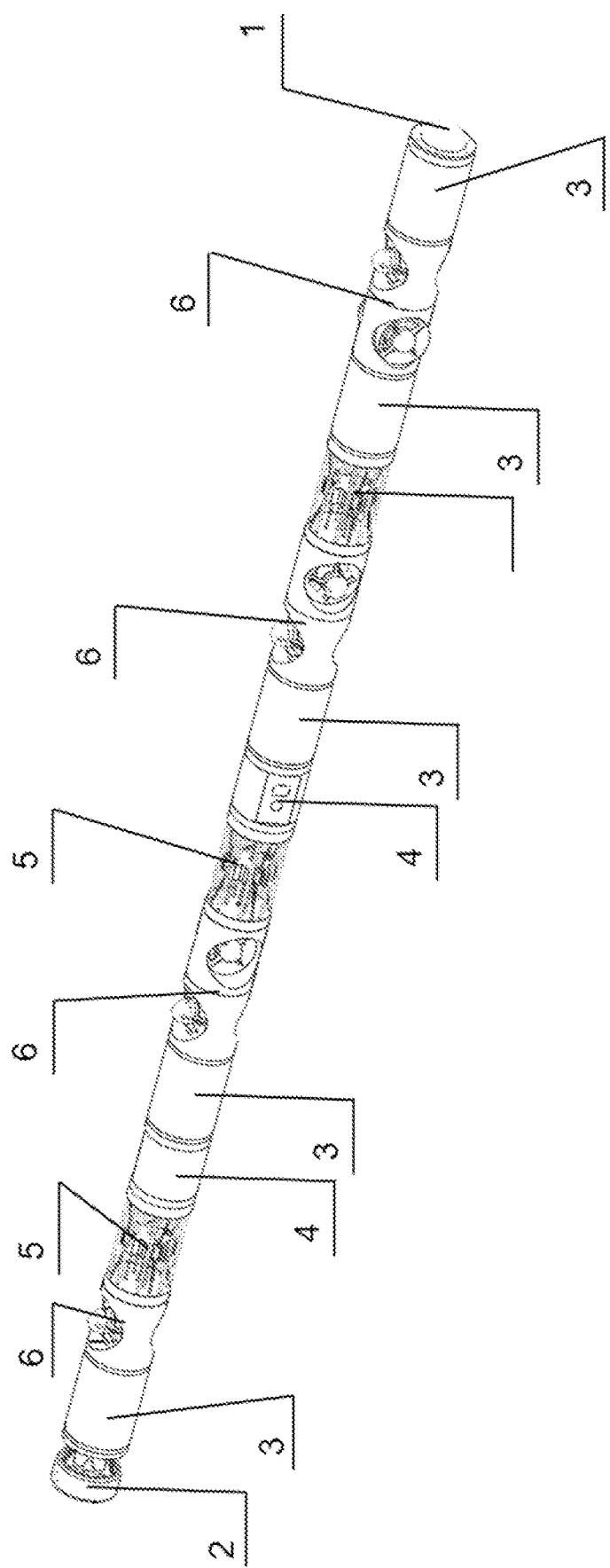
FIG. 1 is a schematic diagram of a flexible underwater robot of an embodiment of the present invention.

As shown in FIG. 1, the embodiments of the present invention provide a flexible underwater robot, including at least one movable joint, a head module 1, a tail module 2, a cavity module 3 and a control module (not shown in the drawing). In the embodiments of the present invention, the movable joint includes a pushing module, a rotating cloud platform 4 and a flexible joint module 5, wherein the pushing module is configured to push the flexible joint module 5 and includes an omnibearing propelling module 6 and a main propeller (not shown in the drawing).

Figure 2:
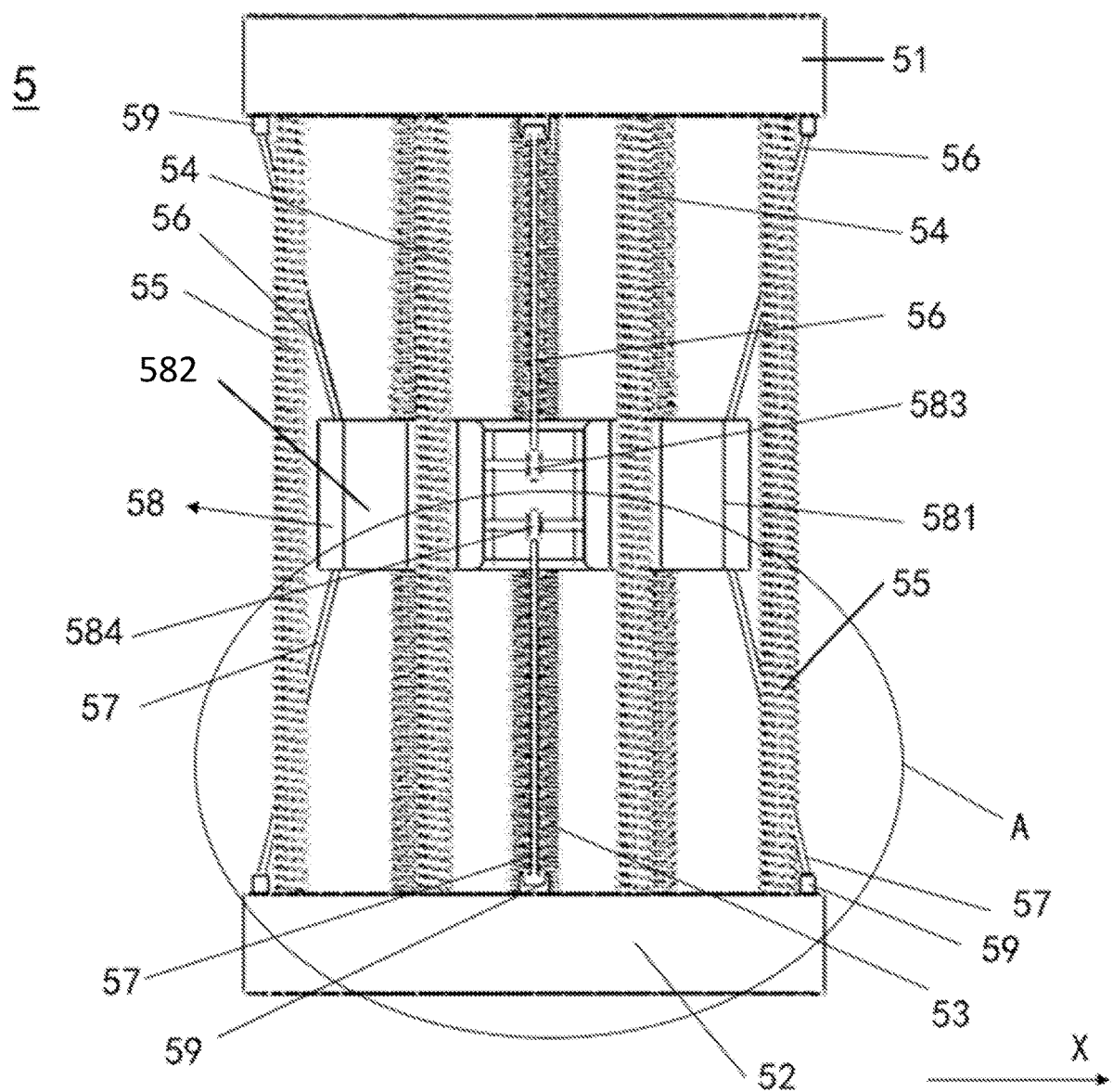
FIG. 2 is a schematic diagram of a flexible joint module of an embodiment of the present invention.
Figure 3:
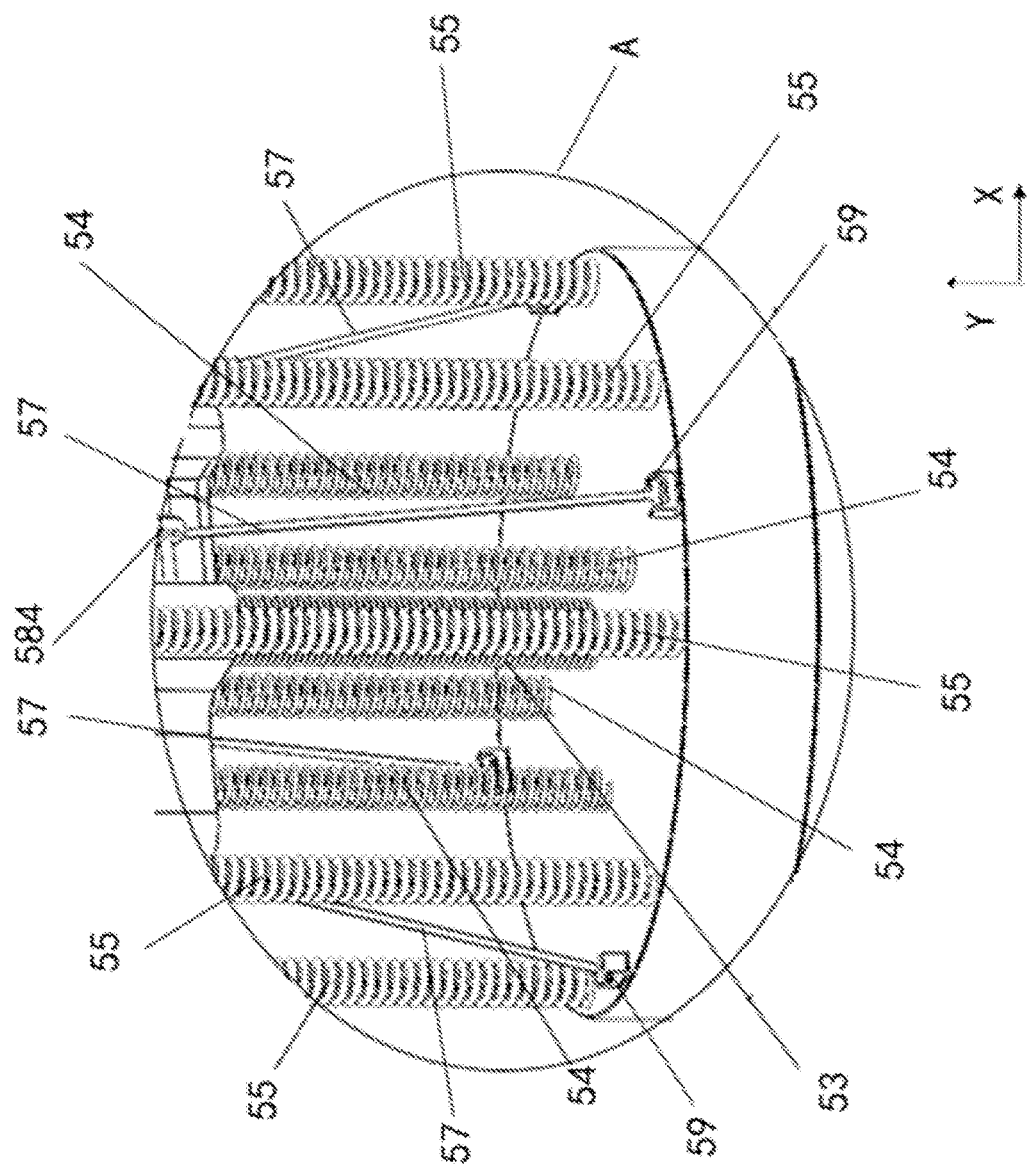
FIG. 3 is an enlarged schematic diagram of A in the FIG. 2.
Figure 4:
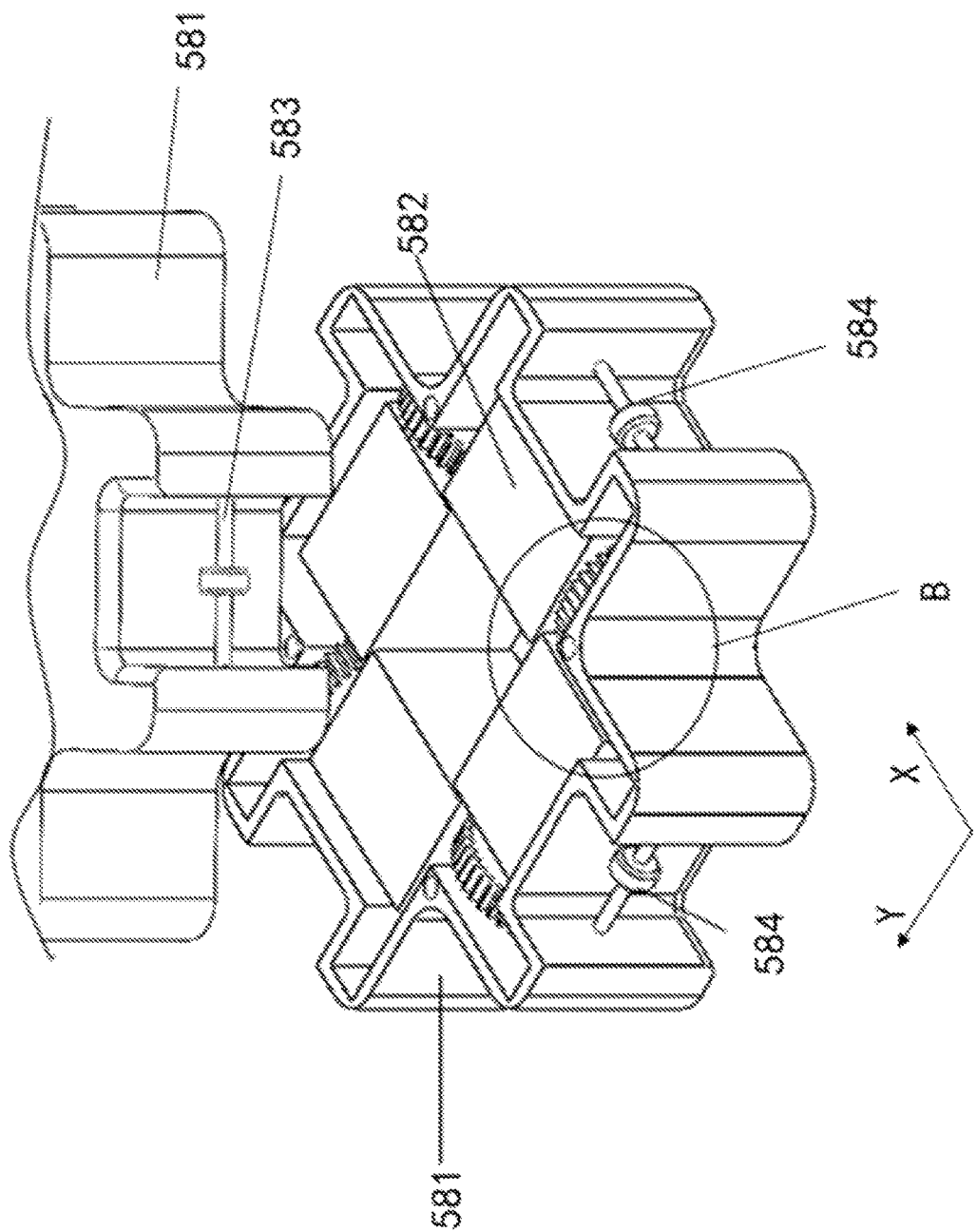
FIG. 4 is a partial schematic diagram of a pulling module of a specific embodiment of the present invention.
Figure 5:
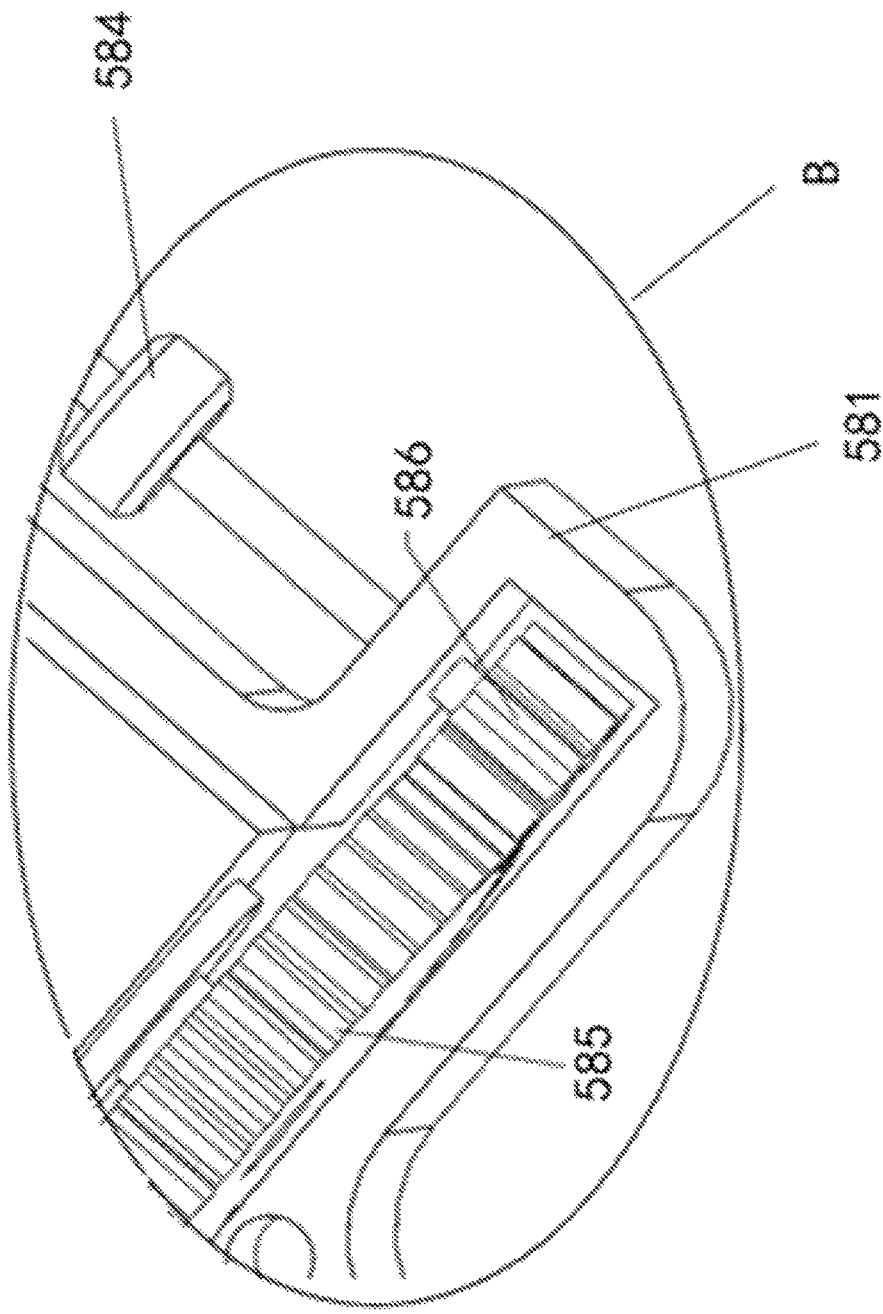
FIG. 5 is an enlarged schematic diagram of B in the FIG. 4.

As shown in FIG. 2, FIG. 3 and FIG. 4, in the embodiment of the present invention, the flexible joint module 5 is fixedly connected with the rotating cloud platform 4 and includes a first connecting plate 51, a second connecting plate 52, a first spring 53, several second springs 54, several third springs 55, several first pulling ropes 56, several second pulling ropes 57 and a pulling module 58, one end of the first spring 53, one ends of the second springs 54, one ends of the third springs 55 and one ends of the first pulling ropes 56 are fixed to the first connecting plate 51, the other end of the first spring 53, the other ends of the second springs 54 and the other ends of the third springs 55 are fixed to the second connecting plate 52, the other ends of the first pulling ropes 56 and one ends of the second pulling ropes 57 are fixed to the pulling module 58, and the other ends of the second pulling ropes 57 are fixed to the second connecting plate 52. Optionally, one ends of different first pulling ropes 56 are fixed to different positions of the first connecting plate 51 and the other ends of different second pulling ropes 57 are fixed to different positions of the second connecting plate 52. For example, they are arranged in four azimuthal positions: front, back, left and right, of the surface of the first connecting plate 51 and are arranged in four azimuthal positions: front, back, left and right, of the surface of the second connecting plate 52. Optionally, the first connecting plate 51 and the second connecting plate 52 are metal materials. The flexible joint module 5 further includes several fixedly connected bobbins 59 arranged on the first connecting plate 51 and the second connecting plate 52 to fix the first pulling rope 56 and the second pulling rope 57.

As shown in FIG. 2, FIG. 3, FIG. 4 and FIG. 5, in the embodiments of the present invention, the pulling module 58 is located between the first connecting plate 51 and the second connecting plate 52 to control the first pulling rope 56 and the second pulling rope 57 to adjust movement of the first connecting plate 51 and the second connecting plate 52. Optionally, the pulling module 58 includes a main body 581, a first steering engine module 582, several first arbor wheel units 583 and several second arbor wheel units 584. The main body 581 is divided into upper and lower portions, the upper and lower portions are same in structure, the upper portion is provided with the first arbor wheel units 583, and the lower portion is provided with the second arbor wheel units 584. Specifically, the first arbor wheel units 583 are located above several second arbor wheel units 584; a front side, a back side, a left side and a right side of the main body are fixed with the first second arbor wheel units 583 and the second arbor wheel units 584; each of the first arbor wheel units 583 is fixed to the other end of each of the first pulling ropes 56, each of the second arbor wheel units 584 is fixed to one end of the second pulling ropes 57, and the first steering engine module 582 is connected with the control module and is configured to control the first arbor wheel units 583 and the second arbor wheel units 584 to rotate. It is to be noted that the first steering engine module 582 may control each of the first arbor wheel units 583 and each of the second arbor wheel units 584 independently. When the first arbor wheel units 583 rotate, the first pulling ropes 56 stretch and move in an up-down direction. When the second arbor wheel units 584 rotate, the second pulling ropes 57 stretch and move in an up-down direction. The first pulling ropes 56 and the second pulling ropes 57 stretch and move in an up-down direction to drive the first connecting plate 51 and/or the second connecting plate 52. Optionally, the way that the first steering engine module 582 drives the first arbor wheel units 583 and the second arbor wheel units 584 may be a way of driving the driving gear 585 to drive the driven gear 586 to further drive the first arbor wheel units 583 and the second arbor wheel units 584. Optionally, the first pulling ropes 56 and the second pulling ropes 57 are made from steel wires.

In the embodiments of the present invention, the first spring 53, the second springs 54 and the third springs 55 are arranged from inside to outside sequentially with the corresponding rigidities being gradually decreased, i.e., they are arranged from the center of the main body 581 of the pulling module 58 away from the main body with the corresponding rigidities being gradually decreased. Optionally, springs made of different materials may be adopted. The first spring 53 is highest in rigidity which includes, but not limited to 1 kN/m, and the first spring is hard to stretch. The rigidity of the second spring 54 is relatively low and includes, but not limited to, 200 N/m. The rigidity of the third spring 55 is relatively low and includes, but not limited to 500 N/m. Therefore, the springs may deform to a large extent to change an included angle between upper and lower portions of the flexible underwater robot. The first spring 53 is located at the center of the main body 581, and the main body is provided with several avoidance grooves for the first spring 53, the second springs 54 and the third springs 55 to pass through. The first spring 53 is of high rigidity, the second springs 54 are of medium rigidity and the third springs 55 are of low rigidity. It is to be noted that when the first pulling ropes 56 and the second pulling ropes 57 stretch to drive the first connecting plate 51 and the second connecting plate 52, the first spring 53, the second springs 54 and the third springs 55 will bend and deform to be responsible for transferring power of upper and lower portions of the flexible underwater robot. Specifically, in a radial deforming process of the three-section springs with gradual changes, inner, middle and outer supporting rigidities change gradually, so that small shape change is represented as low rigidity and large shape change is represented as high rigidity. Impact is slowed down when the flexible joint module 5 deforms, so that the flexible joint module 5 deforms more naturally, and meanwhile, the fatigue lives of a strain region and a structure may be prolonged effectively, and the stability is improved. It is to be understood that the quantities of the second springs 54 and the third springs 55 may be set according to an actual need, which is not defined specifically.

Figure 6:
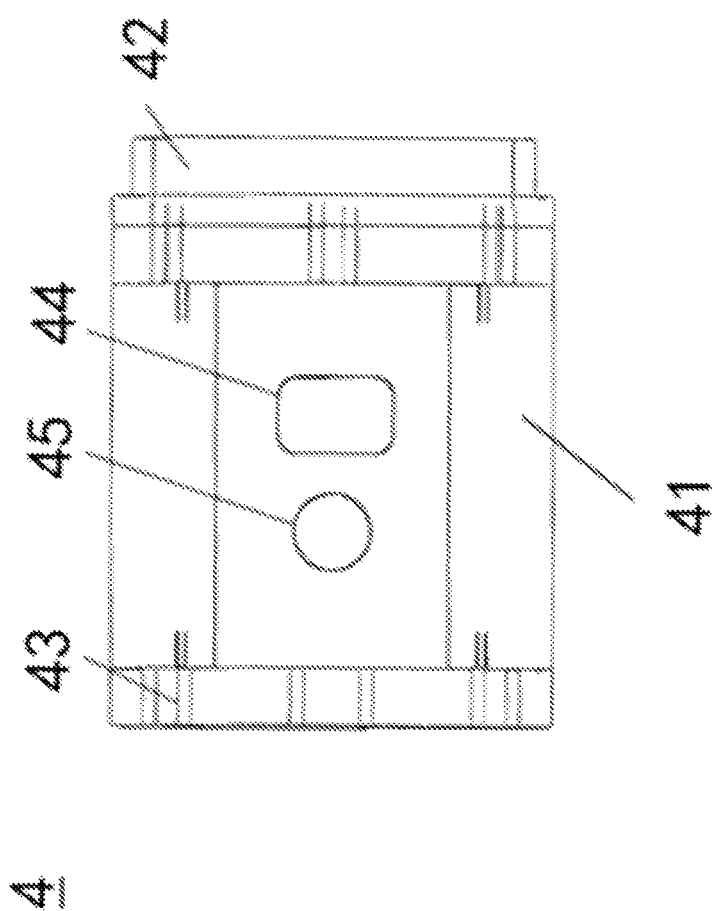
FIG. 6 is a schematic diagram of a rotating cloud platform of a specific embodiment of the present invention.

As shown in FIG. 6, in the embodiments of the present invention, the rotating cloud platform 4 includes a waterproof gasket (not shown in the figure), a cloud platform protecting sleeve 41, a pedestal 42, a second steering engine module (not shown), a waterproof bearing 43, a camera 44 and an ultrasonic probe 45, wherein the ultrasonic probe 45 is configured to acquire ultrasonic signals, the second steering engine module and the camera 44 are connected with the control module; the waterproof gasket is arranged in a part where the pedestal 42 and the flexible joint module 5 are connected fixedly, the second steering engine module and the camera 44 are arranged in the pedestal 42, and the pedestal 42 and the cloud platform protecting sleeve 41 are connected via the waterproof bearing 43. Optionally, the cloud platform protecting sleeve 41 is provided with a through hole through which the camera 44 and the ultrasonic probe 45 are exposed.

Figure 7:
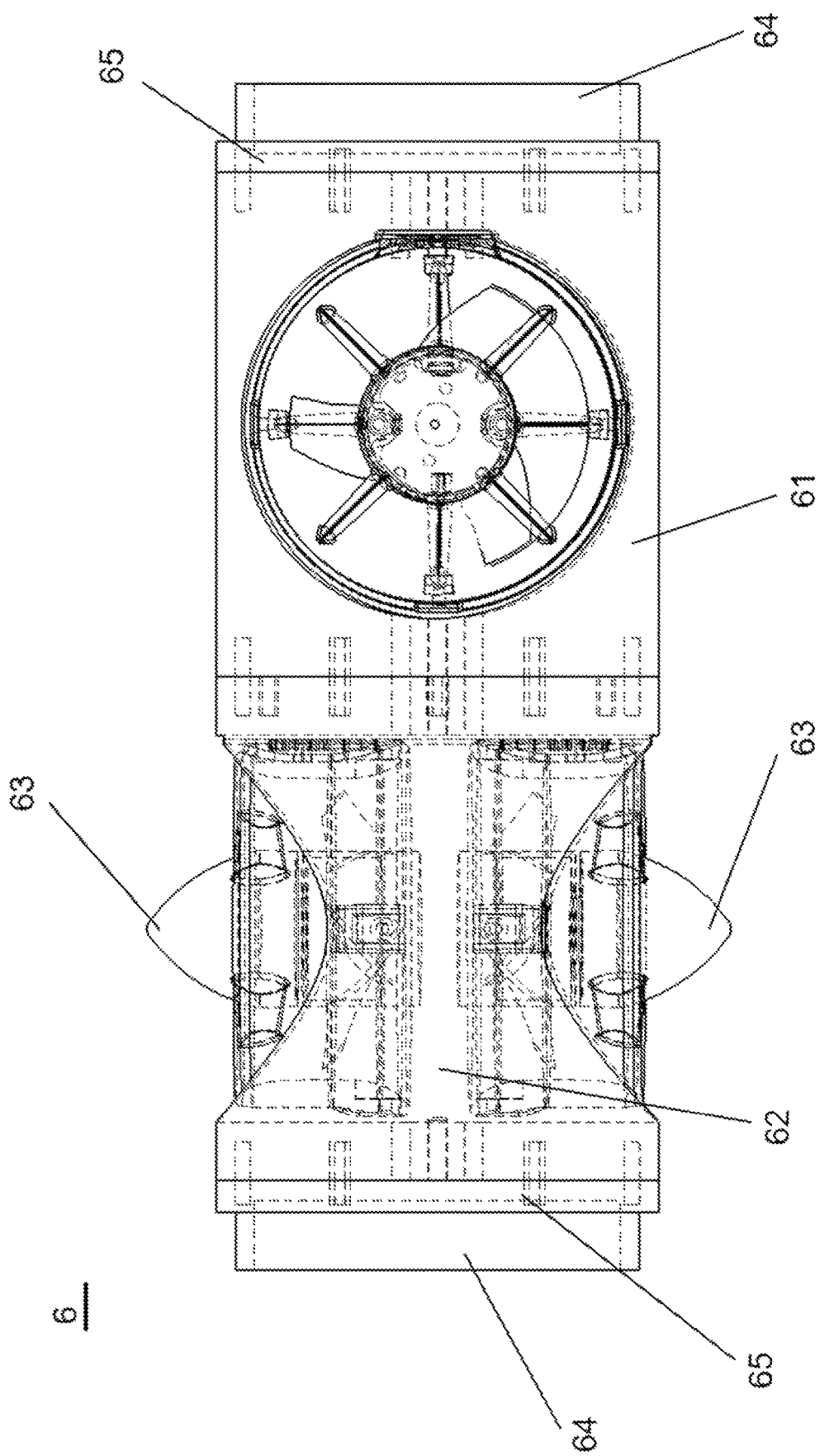
FIG. 7 is a schematic diagram of an omnidirectional propelling module of a specific embodiment of the present invention.

As shown in FIG. 7, in the embodiments of the present invention, the pushing module includes an omnibearing propelling module 6 and a main propeller (not shown in the figure). Optionally, the main propeller is configured to provide a propelling force to the flexible joint module 5. The omnidirectional propelling module 6 includes an outer shell 61, a yaw driver and a pitch driver, and the main propeller, the yaw driver and the pitch driver are connected with the control module; the yaw driver and the pitch driver are housed in the outer shell 61, the outer shell 61 and the flexible joint module 5 are fixed, the yaw driver is configured to control a yaw angle and a pitch angle of the omnidirectional propelling module 6, and the pitch driver is configured to control a sinking and floating gesture and a pitch gesture of the omnidirectional propelling module 6. Optionally, the yam driver includes a brushless motor 62 and symmetrically arranged propellers 63. As the propellers are arranged symmetrically, the dynamic characteristics are highly symmetrical. A larger thrust is generated by reverse rotation by adjusting the yaw process to adjust the gesture more sensitively and rapidly. In addition, the propellers 63 stretch out of the outer shell 61 in a protruding manner, the brushless motor 62 is connected with the propellers 63, the brushless motor 61 receives a pulse width modulation signal of the driving plate to generate different rotating speeds correspondingly, and the driving plate receives a small current control signal sent by a central processor directly. The yaw driver and the yaw driver are hermetically connected and are fixedly locked, the yaw drivers are disposed in a horizontal direction (front and back), and the pitch drivers are disposed in a vertical direction (left and right).

As shown in FIG. 7, in the embodiments of the present invention, the head module 1 is fixed to one of the omnidirectional propelling module 6 and the rotating cloud platform 4 and a fixed position therebetween is provided with a seal ring 64 and a fastener 65, the faster 65 provides a pre-retraction force simultaneously as a rubber ring supporting portion, the tail module 2 is fixed to the other one of the omnidirectional propelling module 6 and the rotating cloud platform 4, the head module 1 is provided with an LED lamp, the main propeller is arranged on the tail module 2, and the LED lamp is connected with the control module.

In the embodiments of the present invention, the head module 1 is a semispherical head transparent protecting hood, which is conducive to reduction of underwater navigation frictional resistance; the LED lamp mounted on the head may illuminate in an underwater dark environment to dispel organisms gathered underwater. A connection of the head is provided with a seal rubber ring 8, and the periphery of the seal rubber ring is perforated, so that the head is firmly connected with other portions.

Optionally, the head module 1 is fixed to one of the omnidirectional propelling module 6 and the rotating cloud platform 4 via a cavity module 3, the cavity module 3 is wrapped by a cylindrical outer shell and is internally provided with a large space, the space is internally provided with a temperature sensor, a pressure sensor, a Doppler velocimeter and a six-axis accelerometer and a control module, and the temperature sensor, the pressure sensor, the Doppler velocimeter and the six-axis accelerometer are connected with the control module to acquire hydrological data. The joint is encapsulated by a hot melt adhesive, so that waterproofness is guaranteed.

It is to be noted that FIG. 1 shows the flexible underwater robot with a plurality of movable joints, which is one of implementation modes. A specific embodiment with one movable joint and one cavity module 3 is described as an example when the embodiment of the present invention is described. Specifically, the flexible joint module 5 is fixedly connected with the rotating cloud platform 4 and the omnibearing propelling module 6, the cavity module 3 is arranged above the rotating cloud platform 4, the rotating cloud platform 4 is fixed to the head module 1 via the cavity module 3, and the tail module 2 is fixed below the omnibearing propelling module 6 as an example, wherein the main propeller is arranged in the tail module 2. It is to be noted that fixation involved in the embodiments of the present invention may include direct fixation or indirect fixation, which is not defined specifically. The outer diameter of each portion in the movable joint and the outer diameter of the cavity module 3 are equal to the outer diameter of the head module 1.

In the embodiments of the present invention, the control module is configured to control the pulling module 58 and the pushing module according to the ultrasonic signals, and specifically control the first steering engine module 582, the omnibearing propelling module 6 and the main propeller. Specifically, the control module is further configured to control the rotating angle of the rotating cloud platform 4 by the second steering engine module and process image data or video data acquired by the camera 44. Optionally, the control module includes the driving plate and the central processor.

According to the flexible underwater robot of the embodiments of the present invention, the first spring 53, the second springs 54 and the third springs 55 are arranged from inside to outside in sequence with gradually decreased rigidities correspondingly to form a gradual rigidity structure, so that it is more flexible to adjust a posture. The robot has an ability of transforming a complex posture, so that the complex control problem when the flexible underwater robot rotates may be simplified greatly. The flexible underwater robot has a certain gentle degree while meeting a precision demand. Matched with the omnibearing propelling module 6, the robot shuttles in a reinforcing steel bar building or a rock and even a pipeline flexibly, so that a polling and troubleshooting task in an underwater precision position is realized. In addition, the robot is of a streamline integrally, free of obvious protrusions, and is prevented from being locked by underwater plants such as sea grass. Compared with an existing robot, the joint structure design is optimized. The omnibearing propelling module 6 with super-redundant degree of freedom of movement is additionally arranged, thereby providing a probability to realize various task for the flexible underwater robot. Meanwhile, the gradual rigidity structure is designed, so that when the robot is impacted, the robot may absorb and release energy to guarantee the integrity of the flexible joint module 5, and therefore, the stability is improved, the impact resistance is high, and the fatigue service lives of the strain region and the structure of the flexible joint module 5 may be prolonged.

As shown in FIG. 8, the embodiments of the present invention provide a control method applied to the flexible underwater robot, the method including the steps S100-S200:

S100, ultrasonic signals are acquired via an ultrasonic probe; and

S200, an expected obstacle avoidance gesture of the flexible underwater robot is calculated by the control module to determine an azimuth angle according to the ultrasonic signals, and a pulling module and a pushing module are controlled by the control module to avoid obstacles according to the azimuth angle.

As shown in FIG. 9, optionally, the control module includes a driving plate, an attitude sensor, an ultrasonic communication module, a battery and a central processor. The battery is configured to supply power to the driving plate, the attitude sensor, the ultrasonic communication module and the central processor. The driving plate includes a transceiving circuit and a microcomputer. It is to be noted that the central processor is configured to receive data of the microcomputer and perform data storage and instruction decision making. In the embodiments of the present invention, the transceiving circuit sends ultrasonic emitting signals towards an appointed direction during work and the signals are reflected on the surface of detected objects such as the polled pipeline or building and are mixed with emitting waves together and information is collected by the ultrasonic probe, so that the ultrasonic signals in the step S100 are obtained; then, the ultrasonic signals are transmitted to the microcomputer via the transceiving circuit to perform operations such as Fourier decomposition of the ultrasonic signals to generate a grain gap graph on the surface of the detected object, and the grain gap graph is transmitted to the central processor or and the grain gap graph on the surface of the detected object is directly sent to a ground station by the microcomputer via the ultrasonic communication module.

An obstacle avoidance policy is arranged in the embodiments of the present invention, so that the integrity of the structure of the flexible underwater robot may be protected preferably. Specifically, when the ultrasonic signals detect the detected object, such as an obstacle, the central controller calculates an expected obstacle avoidance posture of the obstacle of the flexible underwater robot and acquires current attitude position according to the six-axis accelerometer (attitude sensor) for attitude decoupling so as to determine a variable quantity according to the expected obstacle avoidance attitude and the attitude decoupling result. The variable quantity includes but not limited to the azimuth angle. Then, the pulling module and the propelling module are controlled. Specifically, the first steering engine module is controlled according to the azimuth angle to adjust the steering angle of the flexible underwater robot via the flexible joint module and the omnibearing propelling module is controlled to rotate reversely to be matched to avoid the obstacle.

In addition, the hydrologic data acquired by the camera, the temperature sensor, the pressure sensor, the Doppler flowmeter and the six-axis accelerometer is transmitted to the microcomputer to be processed by the microprocessor. A processing result is sent to the central controller and/or the ground station or the microcomputer does not process the data and the hydrologic data is directly sent to the central controller and/or the ground station.

The control method of the embodiments of the present invention further includes a step S300 or a step S400:

S300, when the flexible underwater robot is in the remote control mode, the control module controls the pulling module and the flexible joint module according to a control signal sent by the ground station.

Optionally, in the remote control mode, the central controller receives the control signal sent by the ground station as well via the ultrasonic communication module and the controller in the ground station may acquire state information of the flexible underwater robot via the six-axis accelerometer (attitude sensor) to regulate and control the attitude. Specifically, in order to regulate and control the attitude, a preset connecting rod model may be established in advance, a cartesian coordinate system is established at the tail end of each joint (i.e., the tail ends of the rotating cloud platform, the flexible joint module, the head module, the tail module, the cavity module and the omnibearing propelling module), the joint has two degrees-of-freedom, and equivalently, there is a coordinate system with two superposed origins. Current attitude information is acquired via the six-axis accelerometer (attitude sensor) in the cavity module, so that a rotating matrix among the coordinate systems may be solved. A product of the rotating matrix is calculated from the coordinate system of the least tail end, so that an attitude of the tail end of each joint relative to the tail end of the previous joint may be acquired, i.e., the current attitude. Then, PI operation is performed according to a difference between the expected attitude and the current attitude of the flexible underwater robot, so that the control signal may be obtained. Thus, the control signal includes adjusting information. The current attitude is adjusted to information content of the expected attitude, so that steering and angle adjustment of the flexible joint module and/or the rotating cloud platform is realized.

S400, when the flexible underwater robot is in an autonomous mode, the control module controls the pulling module and the flexible joint module according to a preset task.

In the embodiments of the present invention, the preset task may be set in advance, so that the flexible underwater robot executes the preset task according to a problem that is set in advance. For example, the robot may advance or drive to an appointed target position according to a preset route to acquire the hydrologic data, i.e., the hydrologic data is acquired in the preset task process, and the hydrologic data is stored or is transmitted to the ground station via the ultrasonic communication module. Optionally, in the advancing process of the flexible underwater robot, the joint is straightened in a hydromechanic shape. The main propeller on the tail portion mainly generates a forward thrust and the robot may return according to the preset route or execute a next task after the hydrologic data is collected. It is to be noted that the data stored in the central controller may be extracted and stored by professionals after the flexible underwater robot is recovered.

The embodiments of the present invention further provide an electronic device, the electronic device including a processor and a memory, the memory having at least one instruction, at least one program, a code set or an instruction set stored thereon, the at least one instruction, the at least one program, the code set or the instruction set being loaded and executed by the processor to realize the method in the abovementioned embodiments. The electronic device of the embodiments of the present invention includes, but not limited to, terminals, for example, a mobile phone, a tablet personal computer, a computer, an upper computer, an industrial Personal computer, a vehicle-mounted computer and the like.

The contents in the embodiments of the method are suitable for the embodiments of the device. Functions specifically realized by the embodiments of the device are identical to those of the embodiments of the method. The gained beneficial effects are also identical to those gained in the embodiments of the method.

The embodiments of the present invention further provide a computer readable storage medium, the storage medium having at least one instruction, at least one program, a code set or an instruction set stored therein, the at least one instruction, the at least one program, the code set or the instruction set being loaded and executed by the processor to realize the method in the embodiments.

The embodiments of the present invention further provide a computer program product or a computer program. The computer program product or the computer program includes a computer instruction. The computer instruction is stored in the computer readable storage medium. The processor of the computer device reads the computer instruction from the computer readable storage medium, and the processor executes the computer instruction, so that the computer device executes the control method of the embodiments.

Terms "first", "second", "third" and "fourth" and the like (if exist) in the description and the drawings are used for distinguishing similar objects and not have to describe a specific sequence or precedence order. It should be understood that data used in this way can be interchanged, such that the embodiments of the application described herein can be, for example, implemented in sequences except those illustrated in graph or described herein. In addition, terms "include" and "have" and any deformation thereof are intended to cover non-exclusive inclusions, for example, processes, methods, systems, products or devices including a series of steps or units have not to be limited to clear listing of these steps or units but to include other steps or units that are not listed clearly and other inherent steps or units of these processes, methods, products or devices.

It is to be understood that in the application, "at least one (item)" refers to one or more, and "more" refers to two or more than two. "and/or" is configured to describe an association relationship of associated objects and represents that three relationships may exist. For example, A and/or B may represent three conditions: i.e., independent existence of A, independent existence of B, existence of both A and B and independent existence of B, wherein A and B may be singular or plural. Character "/" in the disclosure usually represents that previous and next associated objects form an "or" relationship. "at least one (item) below" or similar expressions refer to any combination of the items, including a single item or any combination of plural items. For example, at least one of a, b or c may represent a, b and c, "a and b", "a and c", "b and c", or a and b and c", wherein there may be one or more of a, b and c.

In some embodiments provided by the application, it is to be understood that the disclosed device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms. The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement. In addition, each functional unit in each embodiment of the application may be integrated into a processing unit, each unit may also physically exist independently, and two or more than two units may also be integrated into a unit. The integrated unit may be implemented in a hardware form and may also be implemented in form of software function unit.

When being realized in form of software functional unit and sold or used as an independent product, the integrated unit may also be stored in a computer-readable storage medium. Based on the understanding, the technical scheme of the application is substantially represented in form of a software product or a part making contribution in the prior art or all or part of the technical scheme may be represented in form of a software product. The computer software product is stored in a storage medium, including multiple instructions to enable one computer device (may be a personal computer, a server or a network device and the like) to execute all or part of steps of the method in each embodiment. The abovementioned storage medium includes: various media capable of storing program codes such as a U disk, a mobile hard disk, a Read-Only Memory (ROM), a Random Access Memory (RAM), a magnetic disk or an optical disk.

In conclusion, the above embodiments are only used to explain the technical scheme of the application and shall not be construed as limitation. Despite reference to the aforementioned embodiments to make a detailed description for the application, it will be understood by those skilled in the art that they still can modify the technical scheme recorded by the aforementioned embodiments or make equivalent substitutions on part of technical features therein. Such modifications or substitutions do not deviate the nature of the technical scheme from the spirit and scope of the technical scheme embodied in the embodiments according to the application.

The invention claimed is:

1. A flexible underwater robot, the robot comprising:
at least one movable joint, the movable joint comprising a pushing module, a rotating cloud platform and a flexible joint module,
wherein the pushing module is configured to push the flexible joint module;
the rotating cloud platform is provided with an ultrasonic probe to acquire ultrasonic signals;
the flexible joint module is fixedly connected with the rotating cloud platform and comprises a first connecting plate, a second connecting plate, a first spring, several second springs, several third springs, several first pulling ropes, several second pulling ropes and a pulling module, one end of the first spring, one ends of the second springs, one ends of the third springs and one ends of the first pulling ropes are fixed to the first connecting plate, the other end of the first spring, the other ends of the second springs and the other ends of the third springs are fixed to the second connecting plate, the other ends of the first pulling ropes and one ends of the second pulling ropes are fixed to the pulling module, and the other ends of the second pulling ropes are fixed to the second connecting plate; the first spring, the second springs and the third springs are arranged from inside to outside in sequence with gradually decreased rigidities correspondingly to form a gradual rigidity structure; the pulling module is located between the first connecting plate and the second connecting plate and is configured to control the first pulling ropes and the second pulling ropes to adjust movement of the first connecting plate and the second connecting plate; and a control module configured to control the pulling module and the pushing module according to the ultrasonic signals.

2. The flexible underwater robot according to claim 1, wherein one ends of the different first pulling ropes are fixed at different positions of the first connecting plate and the other ends of different second pulling ropes are fixed at different positions of the second connecting plate; the pulling module comprises a main body, a first steering engine module, several first arbor wheel units and several second arbor wheel units; a front side, a back side, a left side and a right side of the main body are fixed with the first second arbor wheel units and the second arbor wheel units; each of the first arbor wheel units is fixed to the other ends of the first pulling ropes, each of the second arbor wheel units is fixed to one ends of the second pulling ropes, and the first steering engine module is connected with the control module and is configured to control the first arbor wheel units and the second arbor wheel units to rotate.

3. The flexible underwater robot according to claim 1, wherein the rotating cloud platform comprises a waterproof gasket, a cloud platform protecting sleeve, a pedestal, a second steering engine module, a waterproof bearing and a camera, and the second steering engine module and the camera are connected with the control module; the waterproof gasket is arranged in a part where the pedestal and the flexible joint module are connected fixedly, the second steering engine module and the camera are arranged in the pedestal, and the pedestal and the cloud platform protecting sleeve are connected via the waterproof bearing.

4. The flexible underwater robot according to claim 1, wherein the pushing module comprises an omnidirectional propelling module and a main propeller; the main propeller is configured to provide a propelling force to the flexible joint module, the omnidirectional propelling module comprises an outer shell, a yaw driver and a pitch driver, and the main propeller, the yaw driver and the pitch driver are connected with the control module; the yaw driver and the pitch driver are housed in the outer shell, the outer shell and the flexible joint module are fixed, the yaw driver is configured to control a yaw angle and a pitch angle of the omnidirectional propelling module, and the pitch driver is configured to control a sinking and floating gesture and a pitch gesture of the omnidirectional propelling module.

5. The flexible underwater robot according to claim 4, wherein the yaw driver comprises a brushless motor and symmetrically arranged screw propellers, the screw propellers stretch out of the outer shell in a protruding manner and the brushless motor is connected with the screw propellers.

6. The flexible underwater robot according to claim 4, the robot further comprising a head module and a tail module, wherein the head module is fixed to one of the omnidirectional propelling module and the rotating cloud platform and a fixed position therebetween is provided with a seal ring and a fastener, the tail module is fixed to the other one of the omnidirectional propelling module and the rotating cloud platform, the head module is provided with an LED lamp, the main propeller is arranged on the tail module, and the LED lamp is connected with the control module.

7. The flexible underwater robot according to claim 6, the robot further comprising a cavity module, wherein the head module is fixed to one of the omnidirectional propelling module and the rotating cloud platform via the cavity module, the cavity module is provided with a temperature sensor, a pressure sensor, a Doppler velocimeter and a six-axis accelerometer, and the temperature sensor, the pressure sensor, the Doppler velocimeter and the six-axis accelerometer are connected with the control module to acquire hydrological data.

* * * * *